United States Patent [19]

Taylor

[11] Patent Number: 5,703,211
[45] Date of Patent: Dec. 30, 1997

[54] COLLAGEN FININGS AND PREPARATION THEREOF

[76] Inventor: Robert Taylor, Shobnall Grange, Shoball Road, Shobnall, Burton on Trent DE14 2BE, United Kingdom

[21] Appl. No.: 404,927

[22] Filed: Mar. 16, 1995

[30] Foreign Application Priority Data

Mar. 17, 1994 [GB] United Kingdom ............... 9405219.8

[51] Int. Cl.$^6$ ............................................. A61K 38/17
[52] U.S. Cl. ................................. 530/356; 530/857
[58] Field of Search .............................. 530/356, 857

[56] References Cited

U.S. PATENT DOCUMENTS 2,262,230 11/1941 Gillman .
5,420,248 5/1995 De Victor et al. ............. 530/356

FOREIGN PATENT DOCUMENTS

| | | |
|---|---|---|
| 432159 | 8/1935 | United Kingdom . |
| 2147299 | 5/1985 | United Kingdom . |
| 2189492 | 10/1987 | United Kingdom . |
| 2255347 | 4/1992 | United Kingdom . |
| 2255347 | 11/1992 | United Kingdom . |

OTHER PUBLICATIONS

The Journal of the Institute of Brewing, vol. LXXIII, A.A. Leach et al, "Collagen Chemistry in Relation to Isinglass and Isinglass Finings—A Review", 1967 Cambridge, pp. 8–16.

*Primary Examiner*—Cecilia J. Tsang
*Assistant Examiner*—Bennett Celsa
*Attorney, Agent, or Firm*—Burns, Doane, Swecker & Mathis LLP

[57] ABSTRACT

The present invention relates to a process for preparing collagen finings. The process comprises providing collagen in the form of undried fish isinglass which has been freshly prepared or frozen, substantially in the absence of any pre-drying, and hydrolyzing the isinglass under conditions to solubilize the collagen. By using freshly-prepared or frozen isinglass, the irreversible changes to collagen arising from pre-drying of isinglass are largely avoided.

28 Claims, No Drawings

COLLAGEN FININGS AND PREPARATION THEREOF

BACKGROUND OF THE INVENTION

1. Field of the Invention

The present invention relates to a process for preparing collagen finings from fish isinglass, collagen finings obtainable therefrom and the use of fish isinglass in such a process.

2. Description of the Related Art

Collagen finings may be used in clarification or precipitation processes, for example for clarifying potable liquors such as beer and wine. During the fermentation of liquors various particulate materials such as yeasts and proteins become suspended in the liquor and need to be removed. Collagen finings are added to the liquor to clarify it by aiding the precipitation of the suspended materials. For example, in the case of beer, collagen finings are added as a solution to the fermented beer in cask and the beer is allowed to clarify before being dispensed. Similarly, the finings are used to clarify bulk beers prior to processing. The finings may also have a beneficial effect upon foam stability and long term haze stability.

Collagen finings are generally prepared from fish isinglass, which constitutes a very pure source of collagen prepared from the dried swim bladders of fish. Suitable fish include members of the polynemidae, sciaenidae and siluridae families. In accordance with traditional practice established over hundreds of years, these bladders are all pre-dried by the action of sun or air in order to stabilize them for storage and sale. An application of traditionally-prepared bladders is disclosed in GB-A-2147299.

SUMMARY OF THE INVENTION

The present applicants have found that this pre-drying step causes changes in the nature of the isinglass, at least some of which is irreversible, so that attempts to rehydrate the dried bladders do not return the bladders to their original state. The applicants have surprisingly found that avoiding the pre-drying step results in a final product with improved properties.

DESCRIPTION OF THE PREFERRED EMBODIMENTS

Accordingly, in one aspect the present invention provides a process for preparing collagen finings. The process comprises providing collagen in the form of fish isinglass which has been freshly prepared or frozen, substantially in the absence of any pre-drying. The isinglass is hydrolysed under conditions to solubilise the collagen.

By using the freshly-prepared or frozen isinglass the irreversible changes to the collagen from the isinglass are largely avoided.

The isinglass is advantageously frozen, for example after having been separated from the host fish. Freezing may take place by any conventional method, for example using blast freezing or flash freezing. Typically, the isinglass is blast-frozen on a conveyor using air at a temperature in the range –40° C. to –50° C. Once frozen, the isinglass may be stored under standard freezer conditions in the range –25° C. to –30° C. This provides a convenient form in which to transport the isinglass. For example, the frozen isinglass can be shipped from source location to process plant even if the source and plant are in different countries.

By rapid freezing and storage in deep-freeze a minimum number of handling steps is required and the isinglass is maintained in a largely sterile condition. This is particularly useful where the isinglass has to pass inspection by port Health Authorities. In contrast, isinglass which has been sun or air-dried risks exposure to airborne spoillage and must be fumigated prior to shipping. In order to ensure that the isinglass product is of an acceptable standard, it is generally necessary to inspect and sort by colour, size and type, and to ensure that all foreign matter is removed. The dried isinglass generally needs to be washed to remove sand and surface dirt and sterilised or bleached. In spite of all these precautions, there is no guarantee that mycotoxins will be completely removed or neutralised.

Once the collagen is provided in the freshly-prepared or frozen state, various processing steps are available and are chosen according to the form of collagen finings ultimately required. For efficient hydrolysis of the isinglass, the surface area to volume ratio of the isinglass must be sufficiently high to permit ready hydrolysis of the isinglass to solubilise the collagen. If the isinglass source material is small enough, comminution of the isinglass may not be necessary. Preferably, frozen isinglass is used and is thawed before hydrolysis. This tends to aid break up of the isinglass tissue, possibly because of expansion of water in the isinglass tissue during the step of freezing and its subsequent contraction during thawing. Where larger isinglass material is used, comminution is preferably used to reduce particle size. Comminution can be performed on either fresh or thawed samples, or on frozen samples. The advantage of comminuting frozen samples is that they tend to be brittle and, provided suitable commercially available comminution means are used, can be readily broken into suitably small particles.

As a further option, the isinglass may be freeze-dried before being hydrolysed in order to facilitate shipping by reducing both volume and weight. Freeze-dried isinglass can be milled to a powder and subsequently used as a source of collagen according to the present process.

The purpose of the step of hydrolysing the isinglass is to solubilise the collagen by breaking the inter-molecular bonds between the triple helices of the collagen molecules so as to free each collagen polypeptide to be available to enter the solution or colloidal state. Typically, hydrolysis is carried out under acid or alkaline conditions. For example, a pH in the range 8 to 13 may be used for alkaline conditions although acid pHs in the range 1.5 to 5 are preferred, more preferably in the range 2 to 2.6. Any suitable food-approved acid may be used for this purpose and typically fruit acids such as citric acid or tartaric acid are used.

It is important to ensure that the conditions of hydrolysis are neither so long nor so severe that the desired collagen product is further degraded, for example to form gelatin. According to the present invention, the isinglass may be hydrolysed so as to solubilise at least 80%, preferably at least 90% of the collagen. This process is generally expected to take up to twelve hours to sixteen hours to complete depending on temperature. Advantageously, the temperature falls in the range 0° to 25° C., preferably 5° to 12° C. Under these conditions, the yield of soluble collagen is typically at least 80%, preferably at least 90%.

The solubilised collagen can be prepared as a liquid, a paste or in a dry form.

In a further aspect of the invention, collagen finings are provided which are obtainable from the foregoing process. It is found that in use, the collagen finings according to the present invention exhibit faster sedementation rates than products made in accordance with the traditional process.

3

Moreover, in terms of effectiveness, it is found that lower concentrations of collagen finings in accordance with the present invention are required to give the same effect as those made in accordance with traditional methods.

The present invention will now be described in further detail by way of example only, with reference to the following Examples.

EXAMPLE 1

Liquid Preparation

Fresh swim bladders from catfish were compared with traditional air-dried bladders from the same fish in terms of collagen yield and solubility.

Whole fresh bladders were separated from the catfish and mixed at a concentration of 11 g/l dry weight equivalent for thirty minutes in phosphoric acid solution at pH 2.0 to 2.6. The mixture was allowed to stand for sixteen hours and then mixed for a further thirty minutes. All operations were performed at 5° C. By dry weight equivalent is meant the weight is adjusted to be equivalent to air-dried bladders by accounting for a moisture content of approximately 20% in the air-dried bladders.

Equivalent standard dried bladders were subject to the same process.

On solubility analysis it was found that the solubility of the collagen prepared from the fresh bladders was 94% whereas the solubility of the collagen prepared from the dried bladders was only 20%.

The freshly-prepared bladders were also compared with the air-dried bladders in order to determine the time taken to achieve a collagen product having 90% solubility. Using the process described above, a total time of only twelve hours was required to achieve this level of solubility using the freshly-prepared bladders. In the case of the air-dried bladders the same solubility level would be achieved only after three weeks in accordance with the traditional process. In order to accelerate the process with the standard dried bladders it was necessary to reduce the bladders mechanically prior to a period of twenty-four hours' vigorous mechanical mixing. Even in this case, a final solubility of only 85% was achieved for the air-dried bladders.

EXAMPLE 2

Liquid Preparation

Freshly prepared bladders from catfish were compared with air-dried bladders in terms of the total yield of collagen finings obtainable from each type of feedstock.

Bladders were treated in accordance with the process described in Example 1, with the exception that the operating temperatures were in the range 6° to 20° C. Air-dried bladders were mechanically reduced and subjected to a twenty-four hour hydrolysis to give rise to a liquid with at least 80% total solubility and at least 70% total nitrogen as dialysable collagen. In contrast, freshly prepared bladders required only a twelve hour hydrolysis without the need for mechanical reduction to give rise to a liquid with at least 90% total solubility and 80% total nitrogen as dialysable collagen.

The dialysable collagen was determined by subjecting the crude hydrolysed product to dialysis in standard dialysis tubing so as to allow small molecules such as gelatin to be dialysed out. The dialysate remaining was subjected to standard (Kjeldahl) analysis to determine the amount of nitrogen present. This method determines the amount of usable collagen formed following hydrolysis.

EXAMPLE 3

Paste Preparation

Separated frozen bladders in accordance with the present invention were compared with standard dried bladders in their ability to be converted into paste.

Each type of bladder was prepared from catfish and suspended in a solution of 12% w/w citric acid at 8° to 20° C., pH 2.60 to 3.00 at a solids content of 35 g/litre dry weight equivalent. The mixture also contained sodium metabisulphite at a concentration of 0.001% by weight. It was found that, in the case of the frozen bladders it took twenty-four hours to reach a level of hydrolysis of 92.9%. Using the standard dried bladders as feedstock it took a further forty-eight hours to reach the same level of hydrolysis.

If standard air-dried bladders are used as the feedstock and are mechanically reduced before mixing, this reduces the time taken to produce the paste to twenty-four hours.

With both types of paste, freeze drying gave rise to a powder which could be reconstituted as collagen finings with a solubility of 90% in the case of standard collagen finings and 94% in the case of collagen finings according to the present invention.

Freeze drying is typically carried out by forming the paste in a Z-blade mixer and passing the mixed paste through an extruder to produce long strands of material having a high surface area. This material is frozen, typically to around −40° C. and subjected to high vacuum for around twelve to sixteen hours. The finished freeze-dried product generally has a moisture content of around 6% or less.

EXAMPLE 4

Dry Isinglass

Fresh and frozen separated swim bladders from catfish were freeze dried in an untreated state under freeze drying conditions described in Example 3. A freeze-dried collagen powder was formed. This was found to be a suitable source of collagen for the manufacture of paste as described in Example 2 above.

In order to achieve a comparable paste, standard dried bladders had to be washed, sanitised, dried again and then mechanically reduced prior to freeze drying.

EXAMPLE 5

Clarification Experiments

Liquid solutions of collagen finings were prepared in accordance with Example 1 above using both traditional dried swim bladders and frozen swim bladders according to the present invention. The liquid solutions produced were standardised to the same total nitrogen levels at 550 ppm and compared in their ability to clarify various beers.

The results of the clarification experiments are set out in the following Table:

| Exp. | Beer Sample | Source of Collagen | Dose Rate | Clarity in EBC units |
|---|---|---|---|---|
|  |  |  |  | (% vol/vol) |
| 1 | A | Air-dried bladders | 0.52 | 5.0 |
|  | A | Frozen bladders | 0.52 | 2.8 |
| 2 | B | Air-dried bladders | 0.17 | 0.9 |
|  | B | Frozen bladders | 0.17 | 0.6 |
| 3 | A | Air-dried bladders | 0.87 | 2.5 |

-continued

| Exp. | Beer Sample | Source of Collagen | Dose Rate | Clarity in EBC units |
|---|---|---|---|---|
| | A | Frozen bladders | 0.69 | 2.3 |
| 4 | B | Air-dried bladders | 1.04 | 0.7 |
| | B | Frozen bladders | 0.52 | 0.3 |

Beer A is a standard keg lager at 3% alcohol and beer B is a cask bitter at 4.2% alcohol.

Clarity was measured using a radiometer haze meter calibrated in formazin units by the Institute of Brewing recommended method.

The results from Experiments 1 and 2 demonstrate that, at the same concentration, collagen finings according to the present invention are more effective at clarifying the beer because a lower figure in EBC units (higher clarity) is obtained. Improvements of clarity readings of up to 40% were obtained with an average improvement of 27%.

Experiments 3 and 4 demonstrate that lower dose rates of the finings in accordance with the present invention need to be used as compared with finings produced by the traditional methods in order to obtain the same levels of sedimentation and clarity.

I claim:

1. A process for preparing collagen finings comprising the steps of providing collagen in the form of fresh undried fish isinglass, freezing the isinglass in the absence of any pre-drying, and hydrolyzing the isinglass under conditions to solubilize the collagen.

2. A process according to claim 1, wherein the isinglass is thawed before being hydrolyzed.

3. A process according to claim 1, wherein the isinglass is comminuted before being hydrolyzed.

4. A process according to claim 1, wherein the isinglass is freeze-dried before being hydrolyzed.

5. A process according to claim 1, wherein the isinglass is hydrolyzed to solubilize at least 90% of the collagen.

6. A process according to claim 1, wherein the isinglass is hydrolyzed at a pH in the range of 1.5 to 5 or 8 to 13.

7. A process according to claim 1, wherein the isinglass is hydrolyzed for 16 hours or less.

8. A process according to claim 1, wherein the temperature of hydrolysis is in the range 0° to 25° C.

9. A process according to claim 1, wherein the solubilized collagen is prepared as a liquid.

10. A process according to claim 1, wherein the solubilized collagen is prepared as a paste.

11. A process according to claim 10, wherein the paste is freeze-dried.

12. Collagen finings prepared in accordance with the method of claim 1.

13. A process for preparing collagen finings comprising the steps of providing collagen in the form of undried fish isinglass which has been freshly prepared in the absence of any pre-drying, and hydrolyzing the isinglass under conditions to solubilize the collagen.

14. The process according to claim 13, wherein the isinglass is comminuted before being hydrolyzed.

15. The process of claim 13, wherein the isinglass is hydrolyzed to solubilize at least 90% of the collagen.

16. A process according to claim 13, wherein the isinglass is hydrolyzed at a pH in the range of 1.5 to 5 or 8 to 13.

17. A process according to claim 13, wherein the isinglass is hydrolyzed for 16 hours or less.

18. A process according to claim 13, wherein the temperature of hydrolysis is in the range 0° to 25° C.

19. A process according to claim 13, wherein the solubilized collagen is prepared as a liquid.

20. A process according to claim 13, wherein the solubilized collagen is prepared as a paste.

21. A process according to claim 20, wherein the paste is freeze-dried.

22. Collagen finings prepared in accordance with the method of claim 13.

23. A process for clarifying fermented beverages comprising the steps of adding collagen finings to the beverage wherein the collagen finings are made from fish isinglass prepared without pre-drying the isinglass, said fish isinglass being hydrolyzed under conditions to solubilize collagen in the isinglass to provide the collagen finings; and precipitating suspended material in the beverage to clarify the beverage.

24. The process of claim 23, wherein the fermented beverage is beer or wine.

25. The process of claim 23, wherein the fish isinglass is fresh at the time of hydrolysis.

26. The process of claim 23, wherein the fish is frozen from a fresh condition prior to hydrolysis.

27. A process for preparing and handling fish isinglass for use in preparation of collagen finings for clarifying potable liquors comprising separating swim bladders from fish; rapidly freezing the freshly separated swim bladders in the absence of predrying; and transporting the swim bladders in a frozen condition.

28. The process of claim 27, wherein the fish are selected from the group consisting of the fish families polynemidae, sciaenidae and siluridae.

* * * * *

UNITED STATES PATENT AND TRADEMARK OFFICE
CERTIFICATE OF CORRECTION

PATENT NO. : 5,703,211
DATED : December 30, 1997
INVENTOR(S) : TAYLOR

It is certified that error appears in the above-indentified patent and that said Letters Patent is hereby corrected as shown below:

<u>ON THE PATENT FACE</u>: Item [75],

Assignee: James Vickers Limited, Burton Upon Trent, United Kingdom

Signed and Sealed this

Third Day of August, 1999

Attest:

Q. TODD DICKINSON

*Attesting Officer*     *Acting Commissioner of Patents and Trademarks*